(12) United States Patent
Köth

(10) Patent No.: US 6,813,991 B2
(45) Date of Patent: Nov. 9, 2004

(54) BRAKING SYSTEM AND FORCE TRANSMISSION ASSEMBLY THEREFOR

(75) Inventor: Boris Köth, Sulzbach (DE)

(73) Assignee: Lucas Automotive GmbH (DE)

( * ) Notice: Subject to any disclaimer, the term of this patent is extended or adjusted under 35 U.S.C. 154(b) by 0 days.

(21) Appl. No.: 10/653,875

(22) Filed: Sep. 3, 2003

(65) Prior Publication Data

US 2004/0069578 A1 Apr. 15, 2004

Related U.S. Application Data

(63) Continuation of application No. PCT/EP02/02473, filed on Mar. 6, 2002.

(30) Foreign Application Priority Data

Mar. 7, 2001  (DE) .......................................... 101 10 931

(51) Int. Cl.[7] ............................ B60T 11/18; F16C 11/06
(52) U.S. Cl. .......................................... 92/187; 403/141
(58) Field of Search ........................ 92/128, 129, 187, 92/188; 403/76, 122, 135, 141, 142, 143

(56) References Cited

U.S. PATENT DOCUMENTS

| | | | |
|---|---|---|---|
| 3,173,344 A | * 3/1965 | Pietro ........................... | 92/187 |
| 4,831,916 A | * 5/1989 | Leigh-Monstevens et al. ............................ | 92/187 |
| 5,143,469 A | * 9/1992 | Cadeddu ..................... | 403/135 |
| 5,163,773 A | 11/1992 | Denney et al. ............. | 403/135 |
| 5,290,120 A | * 3/1994 | Osterfeld et al. ............. | 92/187 |
| 5,794,512 A | * 8/1998 | Prosch et al. .................. | 92/188 |

FOREIGN PATENT DOCUMENTS

| | | |
|---|---|---|
| DE | 31 49 628 | 7/1983 |
| DE | 198 43 316 | 3/2000 |
| FR | 2 788 095 | 7/2000 |
| WO | 88/08801 | 11/1988 |

* cited by examiner

Primary Examiner—Thomas E. Lazo
(74) Attorney, Agent, or Firm—MacMillan, Sobanski & Todd, LLC

(57) ABSTRACT

A load-transmitting arrangement (14) with articulated function for taking up and transmitting a pedal force, in particular a brake pedal force, is described. A braking device (10) of a brake system comprising the load-transmitting arrangement (14) is further described. The load-transmitting arrangement (14) has a first load-transmitting member (20), which has a receiving sleeve (20A) for a second load-transmitting member (22), an end of the second load-transmitting member (22) that projects into the receiving sleeve (20A) engaging behind a snap element (30B), which locks the second load-transmitting member (22) against withdrawal from the receiving sleeve (20A). The end of the second load-transmitting member (22) that engages behind the snap device (30) is a joint head, which is supported pivotally inside the receiving sleeve (20A). The second load-transmitting member (22) is coupled movably to a support device (32), against which the snap element (30B) is non-pivotally supported.

20 Claims, 3 Drawing Sheets

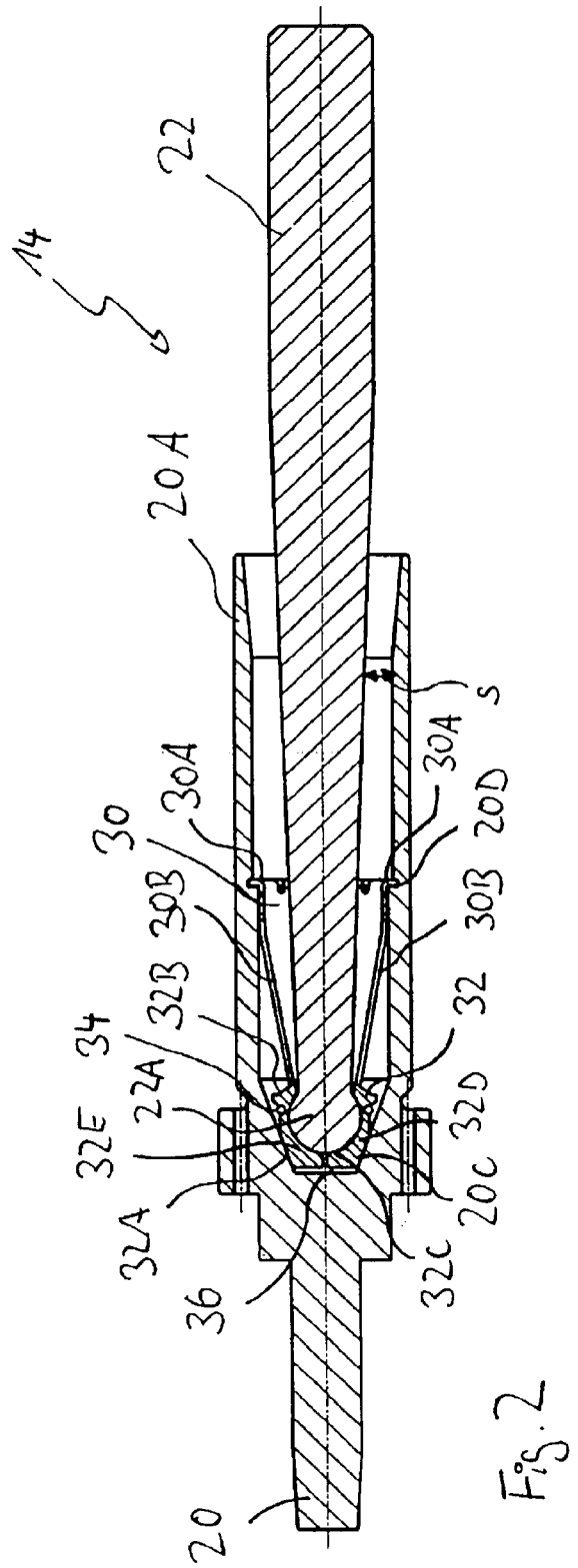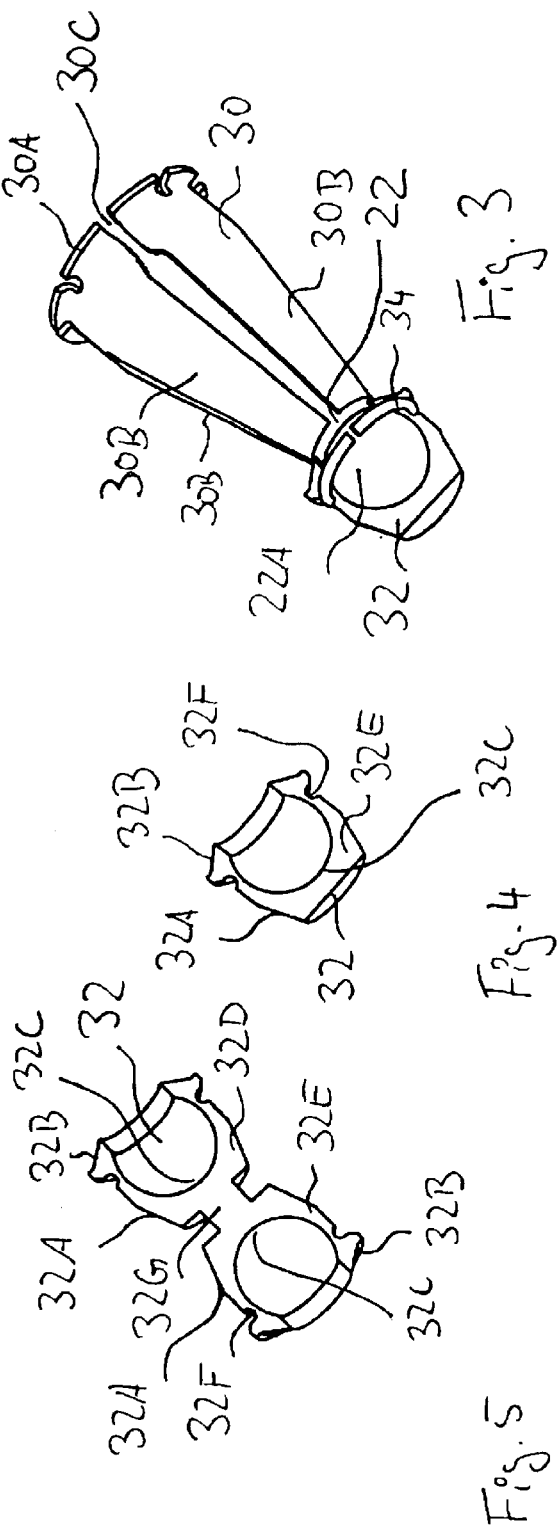

US 6,813,991 B2

BRAKING SYSTEM AND FORCE TRANSMISSION ASSEMBLY THEREFOR

CROSS REFERENCE TO RELATED APPLICATIONS

This application is a continuation of International Application No. PCT/EP02/02473 filed Mar. 6, 2002, the disclosures of which are incorporated herein by reference, and which claimed priority to German Patent Application No. 101 10 931.8 filed Mar. 7, 2001, the disclosures of which are incorporated herein by reference.

BACKGROUND OF THE INVENTION

The invention relates to a brake system as well as to a load-transmitting arrangement with articulated function in particular for said brake system. The load-transmitting arrangement is used to take up and transmit a pedal force and comprises a first load-transmitting member, which has a receiving sleeve for a second load-transmitting member, wherein an end of the second load-transmitting member that projects into the receiving sleeve engages behind a snap element, which locks the second load-transmitting member against withdrawal from the receiving sleeve.

A brake system having such a load-transmitting member is known from DE 198 43 316 A1, which is incorporated by reference herein. The known load-transmitting arrangement comprises a first load-transmitting member in the form of an input member, which is a component of a master brake cylinder or of a brake booster. The input member on its end facing the brake pedal has a receiving sleeve, into which a second load-transmitting member in the form of an actuating rod projects. The end of the actuating rod that projects into the receiving sleeve is designed as a ball head. The ball head of the actuating rod interacts with a snap device, which is disposed in the receiving sleeve and takes the form of a spring sleeve having a plurality of spring elements.

In order to couple the actuating rod to the input member the actuating rod is inserted into the sleeve-shaped receiver. In said case, the ball head bends the radially inwardly projecting spring elements of the spring sleeve radially outwards. As soon as the actuating rod has been fully inserted into the sleeve-shaped receiver, the spring elements are able to snap back again. The snapped-back spring elements engage behind the ball head and hence lock the actuating rod against withdrawal from the receiving sleeve. The spring elements therefore enable a durable rapid connection between the input member and the actuating rod.

In order to realize an articulated function, the end of the input member remote from the brake pedal is designed as a joint head, which lies in a joint socket of a piston of the brake booster or of the master brake cylinder. Said articulated arrangement allows an angular deflection of the input member relative to the piston, in which the joint socket is formed. An angular deflection of the input member relative to the actuating rod, on the other hand, is prevented by the fact that the inside diameter of the receiving sleeve formed integrally with the input member is only slightly greater than the outside diameter of the actuating rod. In other words, with regard to an angular deflection the actuating rod is accommodated substantially without play inside the receiving sleeve.

For various reasons it would be desirable to allow an angular deflection of the actuating piston inside the receiving sleeve relative to the input member, while maintaining the rapid connection. Then, for example, instead of the three-part design of the load-transmitting arrangement a two-part style of construction might be selected. This would also make it possible to reduce the minimum overall length of the load-transmitting arrangement.

Since according to DE 198 43 316 A1 the end of the actuating rod that projects into the receiving sleeve is already provided with a ball head, which lies in a joint socket formed at the base of the receiving sleeve, it might be conceivable to provide play between the outside diameter of the actuating rod and the inside diameter of the receiving sleeve. The actuating rod might then be swivelled inside the receiving sleeve. The drawback of this is however that the spring elements, which engage behind and directly abut the joint head, as a result of swivelling motions of the actuating rod are continuously subject to angular deflections which after only a short time would lead to fatigue fracture of the spring tongues.

From U.S. Pat. No. 5 163 773, which is incorporated by reference herein, a further load-transmitting arrangement with articulated function is known. The known load-transmitting arrangement comprises a first load-transmitting member, which has a receiving sleeve, into which a joint head of a second load-transmitting member may be introduced. To prevent withdrawal of the second load-transmitting member from the receiving sleeve, a sleeve embracing the joint head is provided, in which the joint head is pivotally supported and which by means of a plurality of snap elements is supported in a stationary manner in the interior of the receiving sleeve.

SUMMARY OF THE INVENTION

An object of the invention is to provide an operationally reliable load-transmitting arrangement in particular for a brake system, in which a first load-transmitting member is connectable in a pivotal manner and by means of a rapid connection to a second load-transmitting member.

In a load-transmitting arrangement of the initially described type said object is achieved in that the end of the second load-transmitting member that engages behind the snap element is a joint head, which is pivotally supported inside the receiving sleeve, the second load-transmitting member being pivotally coupled to a support device, against which the snap device is supported in a non-pivotal manner. In a brake system according to the invention the first of the two load-transmitting members may form the input member for actuating a braking device, e.g. a brake-pressure generating unit or a brake booster, and the second of the two load-transmitting members may function as an actuating rod, which is to be connected to the brake pedal.

In the load-transmitting arrangement according to the invention the support device prevents a swivelling motion of the load-transmitting member disposed in the receiving sleeve from being transmitted to the snap device, which locks said load-transmitting member against withdrawal. The snap device is consequently uncoupled by means of the support device from swivelling motions of the load-transmitting member disposed in the receiving sleeve. Said uncoupling therefore prevents swivelling motions between the two load-transmitting members from causing fatigue fractures in the snap device.

The support device is preferably connected in a pivotal but axially immovable manner to the load-transmitting member disposed in the receiving sleeve. After said load-transmitting member has been introduced into the receiving sleeve, the support device as well as the joint head may engage behind the snap element. The snap element may then be supported by means of the support device e.g. against the receiving sleeve or against the load-transmitting member on which the receiving sleeve is formed. Inside the receiving sleeve the support device may abut a stop or a slope and be biased by a resiliently designed snap element towards the receiving sleeve or the load-transmitting member on which the receiving sleeve is formed. In said case, after establishment of the rapid connection between the two load-transmitting members the support device is fixed in axial direction inside the receiving sleeve and connected in a non-pivotal and non-rotatable manner to the support device.

The support device may be designed in various ways. For example, according to a first embodiment it is possible to provide an annular support device, which is supported rotatably and pivotally on the load-transmitting member to be introduced into the receiving sleeve and may be situated in abutment with the joint head. The annular support device at its side facing the joint head preferably comprises a bearing surface for the joint head. After the load-transmitting member has been introduced into the receiving sleeve, the annular support device may abut a step inside the receiving sleeve. According to a second, preferred embodiment the support device embraces the joint head at least in sections and is pivotable relative to the latter. In said case too, the support device in the style of a joint socket may additionally function as a bearing for the joint head. A joint socket for supporting the joint head may also be constructed integrally with the receiving sleeve or the load-transmitting member on which the receiving sleeve is formed. Thus, the base of the receiving sleeve may have the shape of a joint socket.

When the joint is realized by means of a joint head and a complementary joint socket, the joint head is advantageously a ball head, which is supported in a calotte-shaped joint socket. Instead of a joint socket other bearings may be used, such as e.g. bolts, which extend through corresponding openings of the joint head and the receiving sleeve. In accordance with the aspect of a rapid connection, support in a joint socket is however preferred.

The support device may be of a one- or multi-part design. It may, for example, comprise two half-shells, which embrace the joint head. Preferably a support device embracing the joint head is designed in such a way that in every operating state of the load-transmitting arrangement the joint head has a specific amount of play inside the support device. The joint head is then freely pivotable inside the support device.

The individual parts such as e.g. half-shells of the support device may be connected to one another by means of one or more flexible webs. Such a construction of the support device guarantees an easy assembly.

The bottom of the receiving sleeve may have an inside diameter tapering in the direction of actuation of the pedal. Preferably, given such a construction of the receiving sleeve, the support device has a complementary outside diameter tapering in the direction of actuation of the pedal. Such a construction of the receiving sleeve and the support device guarantees self-centring of the support device when the latter, together with the load-transmitting member carrying the joint head, is introduced into the receiving sleeve. Furthermore, by means of such a shaping of receiving sleeve and support device it may be guaranteed, in the case of a multi-part support device, that the individual parts of the support device are automatically fixed relative to one another. In addition, for fixing a multi-part support device which embraces the joint head, one or more retaining rings may be provided, which e.g. prevent the support device from detaching from the joint head.

The snap element may be realized in various ways. According to a preferred embodiment a snap device in the form of a spring sleeve is provided, which as a snap element has at least one spring element. The spring sleeve may comprise one, two or more spring elements, which interact with the support device and which radially surround the outside of the load-transmitting member disposed in the receiving sleeve. In an advantageous manner the individual spring elements are separated from one another by slots extending substantially in axial direction.

According to a particularly preferred embodiment of the invention each spring element via a free end, which is actuable resiliently in a radially outward direction, interacts with an oblique surface formed on the support device. Said oblique surface may have a radial extension that increases in the direction of actuation of the pedal. The oblique surface of the support device is preferably arranged inclined in such a way relative to each spring element that the free end of the spring element runs approximately vertically into the oblique surface. Given such an arrangement, the introduction of load from the oblique surface into the spring element and vice versa is optimal, i.e. the spring element with a maximum force opposes the support device and/or the load-transmitting member coupled to the support device.

The e.g. conically designed oblique face has the further advantage that, depending on the actual position and size of the components involved in the rapid connection, the snap elements may act at a lower and higher point upon the slope. In every possible tolerance situation, therefore, a play-free connection between the spring elements and the detent device is guaranteed.

The spring sleeve may have an axial slot extending over the entire length of the spring sleeve as well as a detent collar extending radially outwards. The axial slot allows a flexible reduction of the diameter of the detent collar so that the latter may interact with a groove formed radially at the inside of the receiving sleeve in order to fasten the spring sleeve inside the receiving sleeve.

Various objects and advantages of this invention will become apparent to those skilled in the art from the following detailed description of the preferred embodiment, when read in light of the accompanying drawings.

BRIEF DESCRIPTION OF THE DRAWINGS

FIG. 2 an enlarged longitudinal section through the load-transmitting arrangement according to the invention illustrated in FIG. 1;

FIG. 3 a perspective view of a cut-out of the load-transmitting arrangement according to FIG. 2;

FIGS. 4 and 5 individual parts of the support device illustrated in FIGS. 1 to 3;

DETAILED DESCRIPTION OF THE INVENTION

Figure 1:
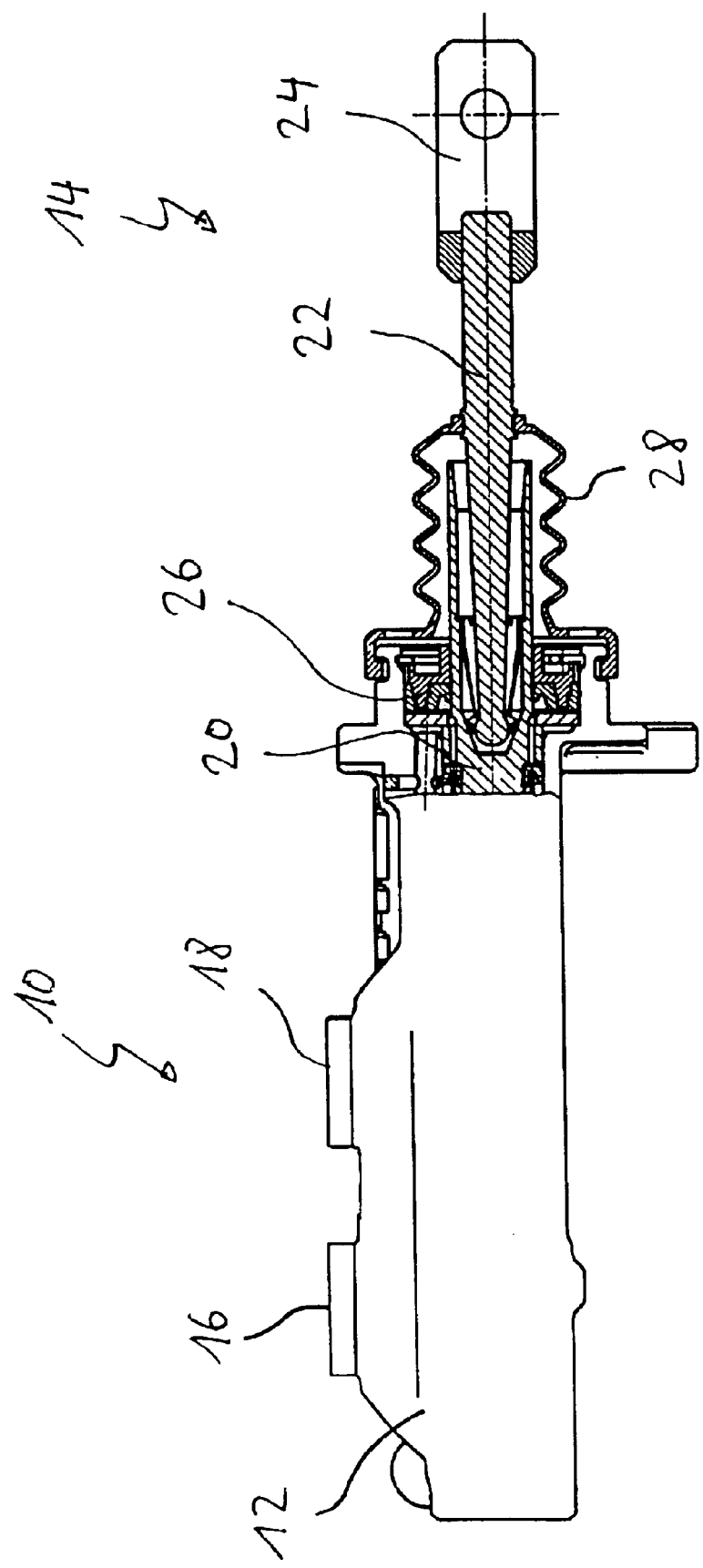
FIG. 1 a longitudinal section through an electro-hydraulic brake system according to the invention with a load-transmitting arrangement according to the invention.

FIG. 1 shows a brake-pressure generating unit 10 of an electrohydraulic vehicle brake system. The brake-pressure generating unit 10 comprises a housing 12 and a load-transmitting arrangement 14 projecting into the housing 12. The housing 12 has two connections 16 and 18 for a fluid reservoir, which is not shown in FIG. 1, and at least one further connection, which is not shown in FIG. 1, for the hydraulic connection of the brake-pressure generating unit 10 to the respective wheel brakes of the motor vehicle.

The load-transmitting arrangement 14 which is disposed in sections inside the housing 12, comprises a first load-transmitting member in the form of an input member 20 for actuating the brake-pressure generating unit 10. The load-transmitting arrangement 10 moreover has a second load-transmitting member, which is rigidly coupled to the input member 20 and takes the form of an actuating rod 22. The actuating rod 22 on its end remote from the brake-pressure generating unit 10 has a fork head 24. The fork head 24 is used to couple the actuating rod 22 to a brake pedal, which is not shown in FIG. 1. During an actuation of the brake pedal the load-transmitting arrangement 14 moves, in FIG. 1, to the left.

The housing 12 at its end facing the load-transmitting arrangement 14 is closed by means of an annular sealing element 26 and the load-transmitting arrangement 14 extends in a sealing manner through a central opening of the annular sealing element 26. A substantially hollow-cylindrical telescopic gaiter 28 is fastened by its one end to the actuating rod 22 and connected by its other end to the housing 12. The telescopic gaiter 28 protects the sealing element 26 from dust, moisture and other external influences.

The construction of the load-transmitting arrangement 14 is sketched in an enlarged longitudinal section in FIG. 2. As FIG. 2 reveals, the input member 20 at its end facing the actuating rod 22 changes into a receiving sleeve 20A, which in the embodiment is formed integrally with the input member 20. The receiving sleeve 20A has an axially extending, central opening in the form of a blind-hole bore 20B. The blind-hole bore 20B is of a tapered or cone-shaped construction in the bore bottom 20C, the inside diameter decreasing in the direction of actuation of the actuating rod.

Approximately in the middle of the receiving sleeve 20A the latter has, radially at the inside, a groove 20D running round in peripheral direction for the latching connection of a snap device. In the embodiment the snap device takes the form of a spring sleeve 30. The spring sleeve 30 is a substantially rotationally symmetric shaped sheet-metal part.

As FIG. 3 reveals, the spring sleeve 30 has, on its one end, a radially outwardly extending detent collar 30A and, on its opposite end, four tongue-shaped spring elements 30B extending in axial direction and bent radially inwards. The spring elements 30B, as will be described in greater detail further below, function as snap elements.

The spring sleeve 30 moreover has an axial slot 30C, which allows a flexible reduction of the diameter of the spring sleeve 30 and hence also of the detent collar 30A. In order to fasten the spring sleeve 30 in the detent position illustrated in FIG. 2, the diameter of the spring sleeve 30 is initially reduced and the spring sleeve 30 of reduced diameter is introduced into the blind-hole bore 20B of the receiving sleeve 20A. As soon as the axial position of the detent collar 30A of the spring sleeve 30 corresponds to the axial position of the detent groove 20D disposed inside the receiving sleeve 20A, the elastically deformed spring sleeve 30 expands radially outwards and presses the detent collar 30A into the detent groove 20D. Once the detent collar 30A of the spring sleeve 30 has latched in the detent groove 20D of the receiving sleeve 20A, the spring sleeve 30 is fitted in an axially immovable manner inside the receiving sleeve 20A.

The actuating rod 22 of the load-transmitting arrangement 14 according to FIG. 2 has on its end facing the input member 20 a joint head 22A. The outside diameter of the actuating rod 22 is markedly smaller than the inside diameter of the receiving sleeve 20A. The play s between the outside diameter of the actuating rod 22 and the inside diameter of the receiving sleeve 20A allows an angular deflection of the actuating rod 22 relative to the input member 20.

The load-transmitting arrangement 14 according to FIG. 2 further comprises a support device 32 in the form of a joint cap, which radially surrounds the outside of the joint head 22A of the actuating rod 22. The support device 32 has a front, conical outer surface 32A, which faces the input member 20 and has an outside diameter decreasing in the direction of the input member 20, as well as a rear conical outer surface 32B, which faces the brake pedal and has an outside diameter increasing in the direction of the input member. The spring elements 30B are situated in abutment with the oblique surface formed by the rear conical outer surface 32B of the support device 32 and press the support device 32 in the direction of the input member 20. Depending on the component tolerances, the spring elements 30B abut the retaining slope formed by the rear conical outer surface 32B at a higher or lower point. Thus, independently of the component tolerances a play-free connection may be achieved between each of the spring elements 30B and the support device 32. The spring elements 30B of the spring sleeve bias the support device 32 in the direction of actuation of the actuating rod 22 towards the bore bottom 20C of the blind-hole bore 20B. The front conical outer surface 32A of the support device 32 therefore abuts the cone-shaped bore base 20C of the blind-hole bore 20B.

The calotte-shaped interior space of the support device 32, in which the joint head 22A of the actuating rod 22 is accommodated, forms a joint socket 32C for the joint head 22A. The outside diameter of the joint head 22A is slightly smaller than the inside diameter of the calotte-shaped interior space of the support device 32. As a result, the joint head 22A is supported in a freely pivotable manner inside the joint socket 32C. In contrast to the joint head 22A, the support device 32 is disposed in a non-pivotable manner inside the blind-hole bore 20B. A swivelling motion of the actuating rod 22 relative to the input member 20 is not transmissible to the support device 32. For said reason, the spring elements 30B of the spring sleeve 30 also remain stationary during a swivelling motion. Fatigue fractures of the spring elements 30B as a result of a swivelling motion of the actuating rod 22 therefore do not arise in the load-transmitting arrangement 14 according to the invention.

The support device 32 comprises two half-shells 32D, 32E, which embrace the joint head 22A of the actuating rod 22 and are held together by a retaining ring 34. The two-part design of the support device 32 allows simplified assembly. By virtue of the interacting of the conical inner surface of the bore bottom 20C and the front conical outer surface 32A of the support device 32 it is guaranteed that the two half-shells 32D, 32E of the support device 32 are held positively together. Thus, the function of the retaining ring 34 is taken over.

In FIG. 3 the arrangement of spring sleeve 30, joint head 22A and support device 32 is illustrated once more by way of example in a perspective view. In FIG. 4 one of the two half-shells 32E of the support device 32 is illustrated. The calotte-shaped interior space of the half-shell is clearly visible. Also visible is a radially outer groove 32F extending in peripheral direction for receiving the retaining ring 34. In a departure from FIG. 4 the two half-shells 32D, 32E of the support device 32 may alternatively be of an integral construction and be connected to a connecting web 32G. Such a design of the support device simplifies assembly because the two half-shells 32D, 32E in order to embrace the joint head 22A need merely be folded together. The cross section of the connecting web 32G is so selected that it does not present any significant resistance to bending. When support devices 32 provided with a connecting web 32G are used, the bore bottom 20C of the blind-hole bore 20B is designed in such a way that after accommodation of the support device 32 there is still a specific clearance 36 for accommodating the bent connecting web 32G.

To assemble the load-transmitting arrangement 14 illustrated in FIG. 2 first of all, as already described above, the spring sleeve 30 is anchored inside the receiving sleeve 20A. Then the support device 32 is connected in a rotatable and/or pivotable and axially non-displaceable manner to the joint head 22A of the actuating rod 22. According to the embodiment this is effected by the joint head 22A being embraced by means of two half-shells 32D, 32E, which are subsequently fixed relative to one another with the aid of a retaining ring 34.

After mounting of the support device 32 on the joint head 22A, the actuating rod 22 with the support device 32 mounted thereon is introduced into the blind-hole bore 20B. In said case, the spring elements 30B of the spring sleeve 30 are bent resiliently in a radially outward direction until the front conical outer surface 32A of the support device 32 has passed the spring elements 30B. The spring elements 30B then snap back in a radially inward direction and press the joint cap 32 into abutment with the conical bottom 20C of the blind-hole bore 20B. At the same time, the spring elements 30B move into abutment with the retaining slope of the rear conical outer surface 32B of the support device 32. After the spring elements 30B have snapped back, a durable rapid connection between the actuating rod 22 and the input member 20 is guaranteed. At the same time, an articulated function is realized by means of the joint head 22A of the actuating rod 22 and the joint socket 32C formed inside the support device 32. The non-rotatable anchoring of the support device 32, which provides a retaining slope for the resilient spring elements 30B, prevents material fatigue in the region of the spring sleeve.

Figure 6:
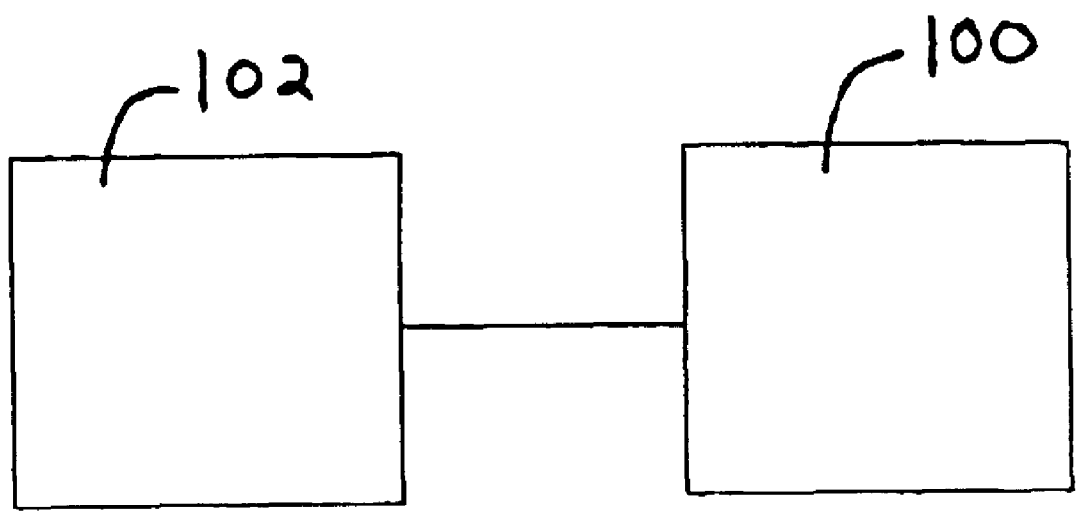
FIG. 6 a schematic diagram illustrating a load transmitting arrangement, in accordance with the present invention used with a brake booster.

Although the above embodiment has been described in connection with an electrohydraulic brake system, a load-transmitting arrangement, schematically indicated at 100 in FIG. 6, may also be used to actuate a brake booster 102, such as a vehicular vacuum brake booster or a hydraulic brake booster, as are well known in the art. The load transmitting arrangement 100 may be similar in design and function as the load-transmitting arrangement 14 in FIGS. 1–5.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. A load-transmitting arrangement with articulated function for taking up and transmitting a pedal force, in particular a brake pedal force, comprising a first load-transmitting member, which has a receiving sleeve for a second load-transmitting member, an end of the second load-transmitting member that projects into the receiving sleeve engaging behind at least one snap element, which locks the second load-transmitting member against withdrawal from the receiving sleeve, wherein the end of the second load-transmitting member that engages behind the snap element is a joint head, which is supported pivotally inside the receiving sleeve, the second load-transmitting member being coupled pivotally to a support device, against which the snap device is non-pivotally supported.

2. The load-transmitting arrangement of claim 1, wherein the snap element biases the support device towards one of the receiving sleeve and the first load-transmitting member.

3. The load-transmitting arrangement of claim 1, wherein the support device embraces the joint head at least in sections.

4. The load-transmitting arrangement of claim 1, wherein the joint head is supported in a joint socket.

5. The load-transmitting arrangement of claim 4, wherein the joint head is a ball head and the joint socket is of a cup-shaped design.

6. The load-transmitting arrangement of claim 4, wherein the joint socket is constructed integrally with the receiving sleeve.

7. The load-transmitting arrangement of claim 4, wherein the joint socket is formed by the support device.

8. The load-transmitting arrangement of claim 1, wherein the support device is of a multi-part design.

9. The load-transmitting arrangement of claim 8, wherein the support device comprises two half-shells, which embrace the joint head.

10. The load-transmitting arrangement of claim 9, wherein the individual parts or half-shells of the support device are fixed relative to one another by means of one or more retaining rings.

11. The load-transmitting arrangement of claim 9, wherein the half-shells of the support device are connected to one another by means of at least one flexible web.

12. The load-transmitting arrangement of claim 8, wherein the individual parts of the support device are connected to one another by means of at least one flexible web.

13. The load-transmitting arrangement of claim 1, wherein a bottom of the receiving sleeve has an inside diameter tapering in the direction of actuation of the second load-transmitting member.

14. The load-transmitting arrangement of claim 1, wherein the support element has an outside diameter tapering in the direction of actuation of the second load-transmitting member.

15. The load-transmitting arrangement of claim 1, wherein the at least one snap element is a spring element.

16. The load-transmitting arrangement of claim 15, wherein the spring element is part of a spring sleeve accommodated inside the receiving sleeve.

17. The load-transmitting arrangement of claim 16, wherein the support device has a retaining slope and by means of said retaining slope interacts with the spring element.

18. The load-transmitting arrangement of claim 1 further including a brake system having an input member for actuating a braking device of the brake system, and an actuating rod to be coupled to a brake pedal, the input member being formed by the first of the two load-transmitting members and the actuating rod being formed by the second of the two load-transmitting members.

19. The brake system of claim 18, wherein the brake system is an electrohydraulic brake system and the braking device is a brake-pressure generating unit.

20. The brake system of claim 18, wherein the braking device is a brake booster.

* * * * *